United States Patent [19]

Trask

[11] Patent Number: 4,647,116
[45] Date of Patent: Mar. 3, 1987

[54] CRAWLER SUSPENSION SYSTEM

[75] Inventor: Walter H. Trask, Pasco, Wash.

[73] Assignee: Riggers Manufacturing Co., Kennewick, Wash.

[21] Appl. No.: 191,211

[22] Filed: Oct. 7, 1980

Related U.S. Application Data

[63] Continuation-in-part of Ser. No. 51,047, Jun. 22, 1979, abandoned, which is a continuation-in-part of Ser. No. 962,163, Nov. 20, 1978, abandoned, which is a continuation-in-part of Ser. No. 840,537, Oct. 11, 1977, abandoned.

[51] Int. Cl.$^4$ .......................................... B62D 55/108
[52] U.S. Cl. ......................................... 305/27; 305/46
[58] Field of Search .............................. 305/27, 15–17, 305/28, 24, 30, 46, 56; 180/9.5, 9.54; 267/141.1, 153, 63 R; 280/716

[56] References Cited

U.S. PATENT DOCUMENTS

| | | |
|---|---|---|
| 1,275,343 | 8/1918 | White . |
| 1,326,975 | 1/1920 | Schneider ..................... 305/15 X |
| 1,367,992 | 2/1921 | Schneider ..................... 305/27 X |
| 1,514,187 | 11/1924 | Wickersham ................. 305/27 X |
| 2,403,362 | 7/1946 | Hait et al. . |
| 2,775,492 | 12/1956 | Wirkkala . |
| 2,982,536 | 5/1961 | Kordes . |
| 3,336,087 | 8/1967 | Reinsma ........................ 305/27 |
| 3,376,031 | 4/1968 | Lee . |
| 3,484,139 | 12/1969 | Danner . |
| 3,695,737 | 10/1972 | Alexander et al. ............ 305/27 |
| 3,718,199 | 2/1973 | Mazzarins . |
| 3,774,708 | 11/1973 | Purcell et al. . |
| 3,910,128 | 10/1975 | Boggs et al. . |
| 3,913,987 | 10/1975 | Baldwin et al. ............... 305/27 |
| 3,929,729 | 12/1975 | Chung ....................... 267/63 R X |
| 3,938,606 | 2/1976 | Yancey . |
| 3,985,402 | 10/1976 | Reinsma ........................ 305/27 |

FOREIGN PATENT DOCUMENTS

| | | | |
|---|---|---|---|
| 321467 | 6/1920 | Fed. Rep. of Germany ........ | 305/27 |
| 335048 | 3/1921 | Fed. Rep. of Germany ........ | 305/27 |
| 911354 | 5/1954 | Fed. Rep. of Germany ........ | 305/27 |
| 2109236 | 9/1972 | Fed. Rep. of Germany ........ | 305/27 |
| 504787 | 7/1920 | France ................................ | 305/27 |

*Primary Examiner*—Charles A. Marmor
*Attorney, Agent, or Firm*—Klarquist, Sparkman, Campbell, Leigh & Whinston

[57] ABSTRACT

A suspension arrangement for a heavy crawler vehicle having plural supporting rollers which are constructed and mounted on elastomeric pad devices such that the overall loading characteristic of the pads is non-linear and terminates in a bulk modulus compression range. The roller assemblies and pad devices are disposed in cavities in free sliding contact with the cavity walls. The rollers and elastomeric pad devices are so constructed as to facilitate relative vertical movement of the rollers under load along the sideframe to enable the vehicle to operate on uneven surfaces with superior load distribution between the totality of load-supporting rollers. The present invention also includes a crawler vehicle having tracks mounted for rolling action in either parallel or converging planes, depending on the contour of the road surface. The present invention also contemplates roller units mounted for lateral rocking movement, and also four roller units.

15 Claims, 18 Drawing Figures

CRAWLER SUSPENSION SYSTEM

FIELD OF THE INVENTION

The present invention relates to a suspension system for a crawler vehicle. This application is a continuation-in-part of co-pending application Ser. No. 051,047, filed June 22, 1979, (now abandoned) which in turn is a continuation-in-part of application Ser. No. 962,163, filed Nov. 20, 1978 (now abandoned), which in turn is a continuation-in-part of application Ser. No. 840,537, filed Oct. 11, 1977 (now abandoned), all entitled "Crawler Suspension System".

BACKGROUND OF THE INVENTION

Many crawler vehicle suspension systems have previously been constructed with the load supporting rollers adapted to compress elastomer pads under loads for better distribution of the load between the rollers. In certain resilient installations, the stress can become quite large, in fact, large enough to rupture the elastomer or to tear the adhesive bond between the elastomer and the associated mounting structure to which the pads are vulcanized or adhesively secured. Furthermore, the mounting arrangement for the rollers in resilient installations has been complicated. Still further, while the rollers of some crawler vehicles can adjust vertically to accommodate longitudinal variations in ground elevation, excessive roller loading occurs when the crawler vehicle travels over a crowned or laterally convex surface because of the lack of lateral load distribution.

SUMMARY OF THE INVENTION

In accordance with the present invention, the supporting rollers are mounted by elastomeric pad devices so constructed and configured that the overall loading curve of the pads is non-linear; having a low profile or slope and thus relatively significant yield per unit load increase when subjected to normal loading, a steeper profile when subjected to overloads, and an almost vertical profile under emergency loading conditions. When subjected to the latter condition, the pads are so confined that only bulk modulus compression can occur, thereby protecting the elastomer pads against rupture or tearing away from their mounting plates.

Also, I mount the rollers and pad devices in a simple manner, namely, in sliding contact with the walls of a mounting pocket or cavity.

Furthermore, I provide rollers and pads in a paired side-by-side arrangement having vertical motion independent of each other thereby to achieve lateral as well as longitudinal load distribution facilitating operation of the vehicle on crowned or other uneven surfaces with a more equitable load distribution among the totality of load-supporting rollers.

In some embodiments, the rollers are permitted to rock or angularly adjust sideways to reduce edge loading of the roller and wear on them and the bearings for the rollers.

In one embodiment of the invention, the crawler track frame has rollers arranged in sets of four, rather than two, for handling heavier load conditions than when rollers are arranged in sets of two.

DESCRIPTION OF PREFERRED EMBODIMENTS

Figure 1:
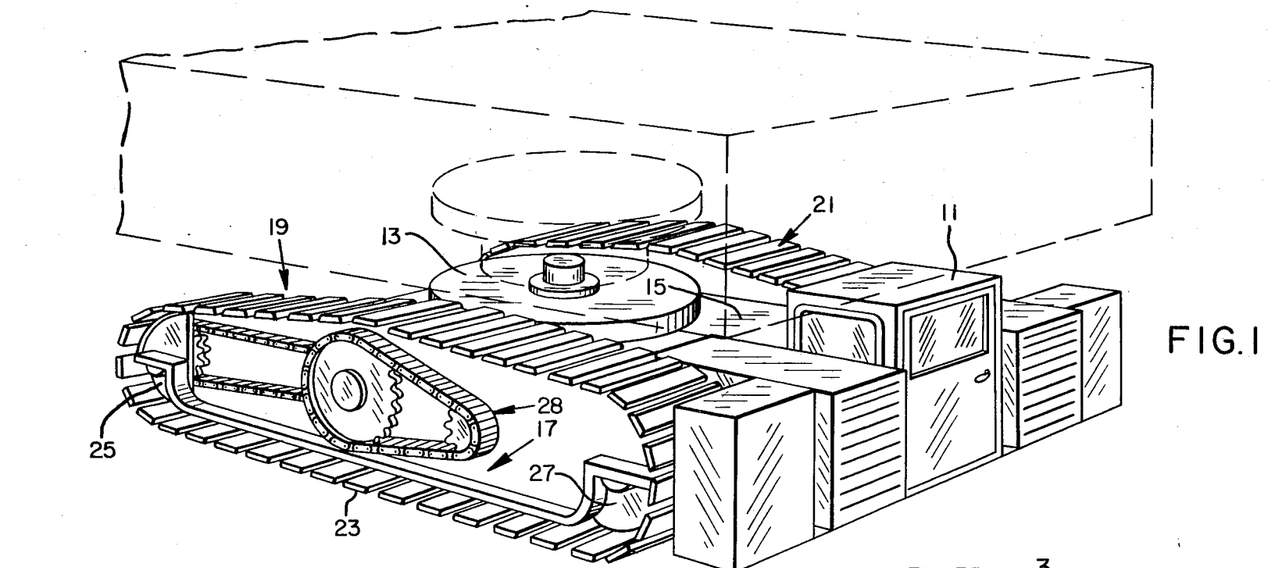
FIG. 1 is a perspective view of a crawler vehicle incorporating the concepts of the present invention.
Figure 2:
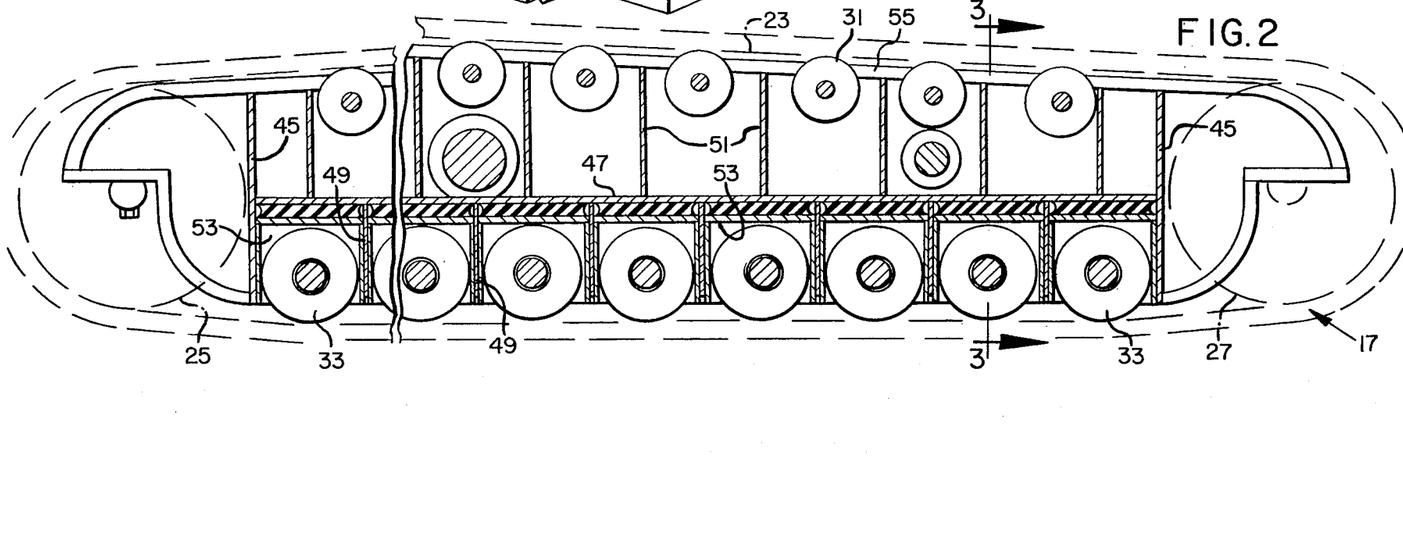
FIG. 2 is a longitudinal vertical section through one of the crawler track frames.

Referring to FIG. 1, the crawler vehicle shown includes a cab 11 mounted on a framework 15 which is permanently and rigidly secured at its opposite sides to the track frames 17 of a pair of crawler track units 19 and 21. The crawler track frames are of identical construction so only the details of unit 19 will be described. The frames are of conventional construction, up to a point, and hence frame 17 has a flexible track 23 traveling around a bull wheel 25 (FIG. 2) and an idler wheel 27. The latter are rotatably mounted on the track frame 17 in a known manner. The bull wheel is driven from an engine (not shown, but carried by the framework 15) via a speed reduction chain and sprocket drive 28 of conventional form. The upper reach of the track 23 rides over plural upper rollers 31 mounted on the track frame. The lower reach passes under plural supporting rollers 33.

Crawler-supported equipment, and particularly crawler transporters for carrying sizable loads, have progressively grown in size and tonnage over the years, producing peak loads in excess of 300 tons for each supporting roller. When a crawler passes over uneven ground or an abrupt rise, each supporting roller in turn is required to assume a disproportionately larger share of the total load. Much difficulty, breakage and rapid wear has been experienced with existing crawler vehicles operating under such severe conditions; in particular where rollers are rigidly affixed to track side-frames.

My crawler vehicle is capable of operating under the above conditions with minimal breakage, wear and maintenance. In my crawler vehicle the track frame is of hollow construction and includes a pair of spaced side walls 41 and 43 (FIGS. 3) joined by plural full height cross plates 45 (FIG. 2), a horizontal cross plate 47, a series of shorter, lower cross plates 49 extending downwardly from the horizontal cross plates 47. The above plates define a series of downwardly facing mounting pockets or cavities 53. A series of shorter, upper cross plates 51 extend upwardly from the horizontal plate 47 to a heavy peripheral plate member 55. The cross plate 47 constitutes a thrust-receiving structure.

Figure 3:
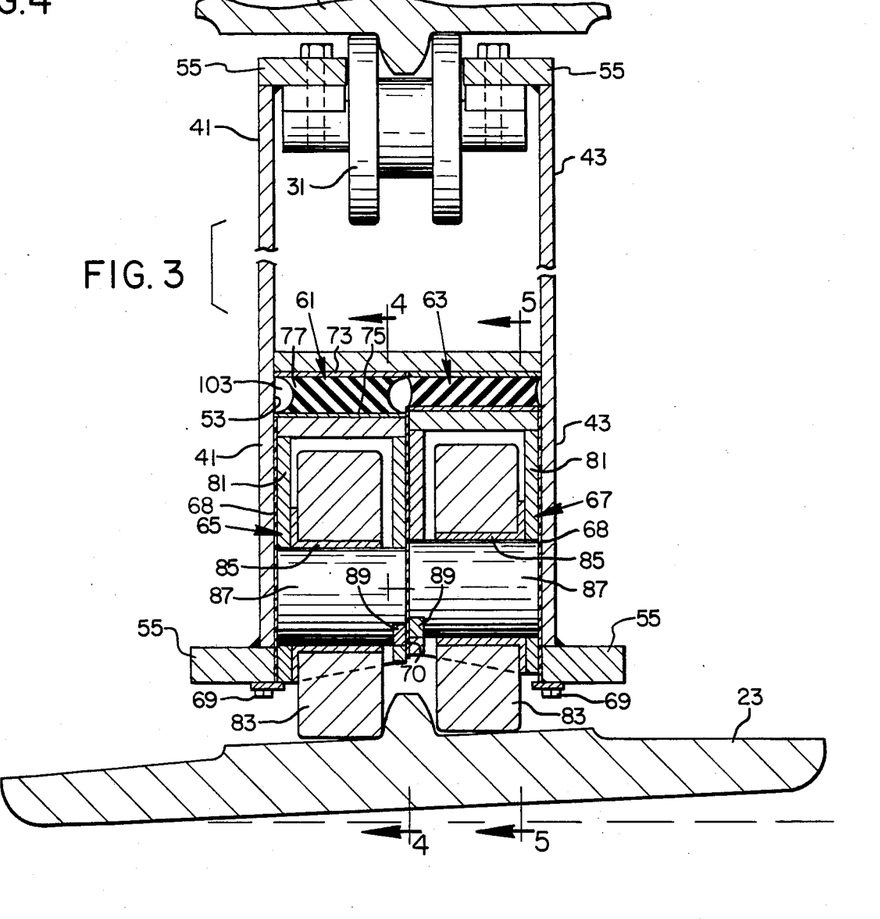
FIG. 3 is a vertical section taken along line 3—3 of FIG. 2, showing the roller units operating on a laterally inclined or crowned surface.
Figure 4:
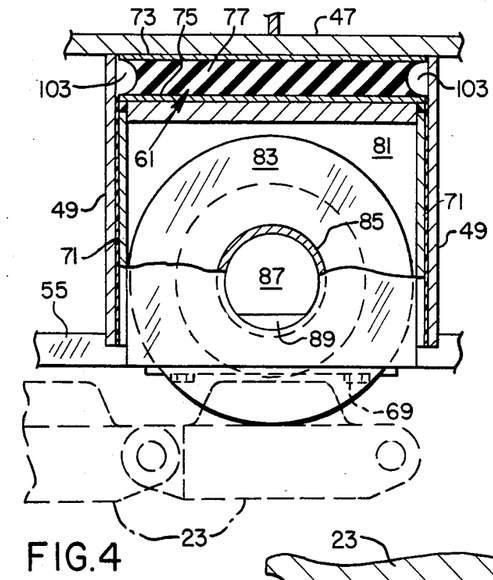
FIG. 4 is a vertical section taken along line 4—4 of FIG. 3.
Figure 5:
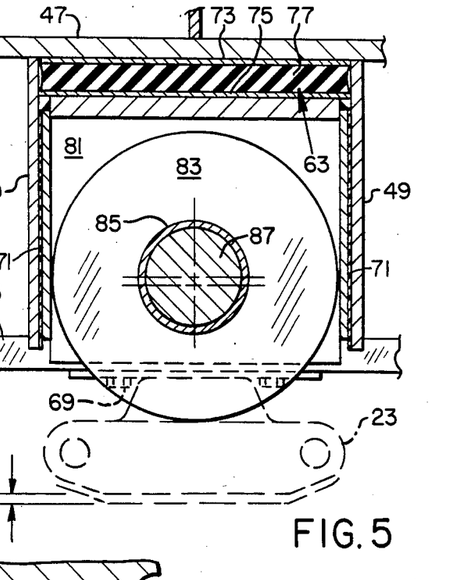
FIG. 5 is a vertical section taken along line 5—5 of FIG. 4 showing a pad device in partially compressed condition.

FIG. 3 shows a mounting pocket or cavity 53 containing a pair of elastomer pad devices 61 and 63 and also a pair of roller units 65 and 67. The pad devices are so sized that, side-by-side, they just fit within the pocket and are slid into place. The roller units are similarly sized and similarly fit within the pocket. A wear plate 68 is secured to the inner face of each of the side walls 41 and 43. A similar wear plate 70 is provided on the inner face of roller unit 67. Wear plates 71 are provided on the inner faces of the plates 49 (FIGS. 4 and 5).

The above arrangement provides for utter simplicity in mounting the pads and roller units, since no other mounting structure is required other than the provision of retainers 69, which are detachably bolted to the lower edges of the peripheral frame member 55. These retaining devices, however, are primarily for the purpose of preventing the roller units and pad devices from dropping out at the time of assembly.

Each elastomer pad device comprises an essentially rectangular pad of elastomer 77 sandwiched between and bonded to a pair of rectangular mounting plates 73 and 75.

Each roller units a metal box 81 open at its bottom and carrying a supporting roller 83. Each roller is mounted in place by a plain bearing 85 on a shaft 87. The ends of the shaft project into openings in the side walls of the associated box. One end of each shaft is cut away or notched to receive a circular segment 89 rigidly secured to the box. The segments prevent rotation of the shafts. This assures that lubricating channels (not shown) provided in each of the shafts and leading to the bottom surface of the shafts, will always be properly oriented in contact with the load bearing side of the roller.

Figure 7:
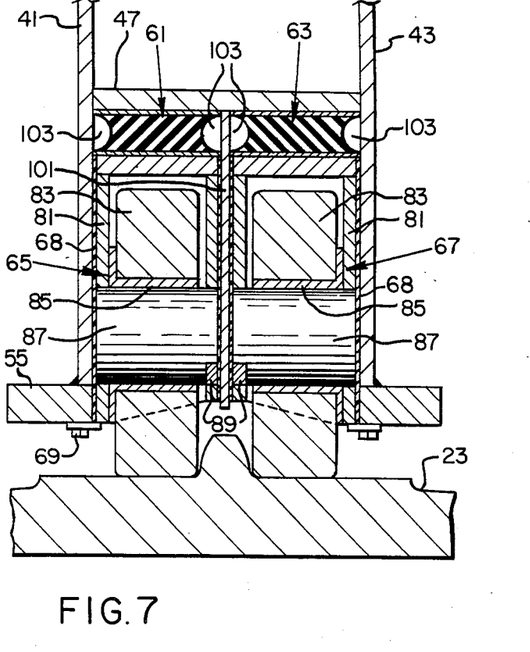
FIG. 7 shows a modified roller supporting assembly.

FIG. 7 shows a modified form of the invention which is identical to the FIG. 3 form except that there is a divider wall 101 provided between the pairs of pad devices and roller units to define a divided mounting pocket or cavity.

It is evident from FIG. 3 that a pad, in its unloaded condition, has a pair of concave, semicylindrical recesses 103 formed in the sidewalls thereof. Similar recesses are formed in the end walls, as is evident from FIG. 4. Since the pad devices are in sliding contact with the associated pocket 53, the walls of the pocket would preclude any lateral distorting movement of the sidewalls of the pad were it not for the space created by the recesses 103.

An important feature of the invention is to provide a suspension arrangement for a crawler vehicle, particularly one for operating under heavy loading, wherein there is a first range of compression, which covers normal operating conditions, under which the elastomer pad devices have considerable give, and wherein the deformation rate is roughly linear and has a low slope. This is to be followed by an overload range in which the deformation per unit rise in load is less than previously. Finally, the pad device is to have a range beyond the overload range, which might be termed an emergency range, in which further compression is possible only by bulk modulus compression of the elastomer pads. The three ranges may be considered as comprising an operating range having a low spring rate, an overload range having semi-snubbing characteristics, and an emergency range in which the yielding means undergoes bulk modulus compression.

Figure 8:
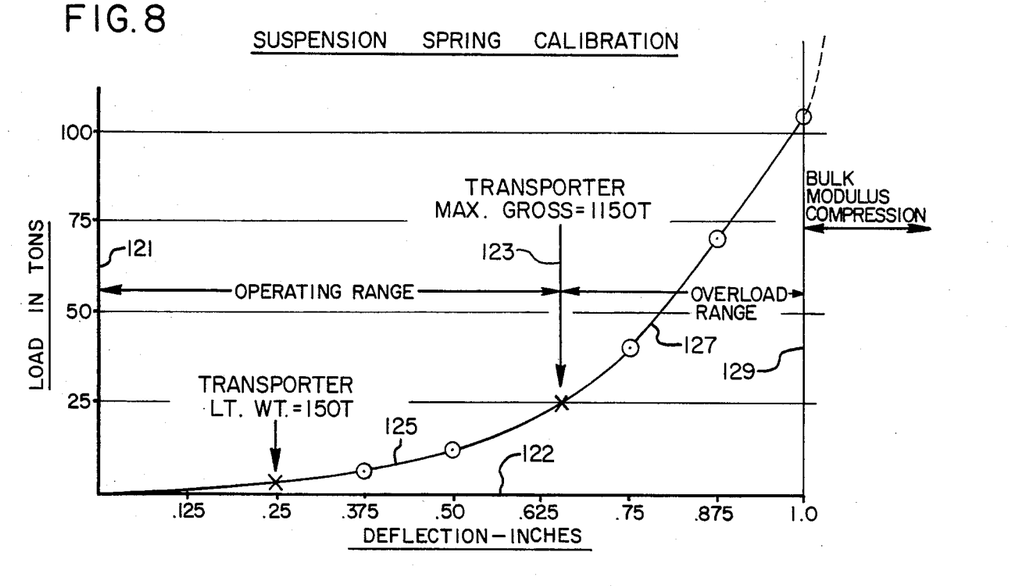
FIG. 8 is a graph showing the compression characteristics of a pad of the present invention.

The structure shown in the drawings accomplishes the above objectives as is evident from FIG. 8, which is a graph showing the deflection curve of a pad of the present invention. The ordinate 121 is "Load in Tons" while the abscisa 122 is "Deflection Inches" for one specific elastomer pad. The operating range of pad loading extends from the ordinate 121 to the vertical line 123. Over this range the pad 77 deflects and is extended laterally to partially fill the cavities 103. At this time, the stress in the pad and in the bond between the pad and the mounting plates 73 increases, however, within acceptable limits. Note that the operating portion 125 of the curve has a low slope, showing substantial deflection relative to the increase in tonnage load per roller.

The overload range 127 commences beyond the line 123 and extends to the line 129. In this range, the curve is of greater slope, meaning that the amount of deflection is considerably less per unit increase in load as compared to that of the normal operating range 125.

Figure 6:
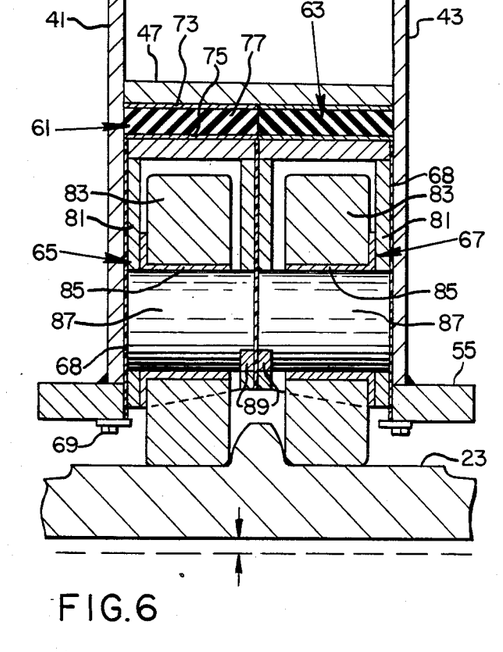
FIG. 6 is a vertical section taken along line 6—6 of FIG. 2 showing the roller pair in the fully compressed or maximum travel position.

Assume now that a crawler vehicle rides over a bump, so that a single roller pair is required to take a much greater share of the load than normal. The loading then may exceed that represented by line 129. At this time, however, the elastomer has expanded until, as shown in FIG. 6, it is in flush contact with the surrounding walls so that further compression of the elastomer can occur only by bulk modulus compression. The deflection under these circumstances is very meager, even for intensive loading. However, the bulk modulus compression does assure that the elastomer will not be overstressed or ruptured and assures that the bond between the elastomer pad and its mounting plates will not be overstressed and separate or tear the elastomer from its mounting plates or cause partial separation.

Note that under bulk modulus compression conditions, FIG. 7 shows that it is the steel walls of the cavity or pocket on all sides of the elastomer pad that comprise the confining walls for the pad, whereas in the FIG. 3 form of the invention, the same is true except for the opposing faces of the two elastomer pads opposite each other, in which case certain of the confining walls are provided by such faces. FIG. 6 shows the opposing faces of the elastomer pads in direct contact precluding further compression.

FIG. 3 shows another feature of the invention which enables the crawler vehicle to operate on "crowned" or laterally convex surfaces without excessive loading. On such surfaces, the lower reach of the track 23 on one side of the crawler will assume an askew position to the horizontal, as shown in FIG. 3, whereas the lower reach of the track 23 on the opposite side of the crawler will be askew in the opposite direction (not shown). The structure that enables a crawler track to assume an askew position without excessive loading is the pairing of the roller units, and their associated elastomer pad devices, side-by-side as shown in FIG. 3 so that the elastomer pad above the right hand roller unit 67 can be substantially compressed with the roller unit rising in its pocket 53 but allowing the roller unit 65 to remain down, but assuming part of the load. Were it not for the ability of the laterally related roller units to move relative to one another, when the crawler track assumes the position in FIG. 3, the inner roller 83 would assume the full load that a pair of rollers is to assume, thus greatly increasing the loading on the inner roller to dangerous levels and cause intensive wear and possible breakage. Thus the independently adjustable side-by-side roller construction has superior load distribution characteristics as compared to a unitary double roller.

When it is desired to replace or inspect a roller or its pad, this can be accomplished quite simply by uncoupling the associated crawler track, lifting the associated track frame and then removing the associated retainers 69 to allow the roller and pad to drop out.

It is pointed out that while the lower reach of the track 23 in FIG. 3 is oblique to the horizontal, the upper reach is horizontal. This condition is permitted by the flexibility of the track.

FIGS. 9-12 show a modified form of the invention which is similar in many respects to the first form. The roller unit assembly or suspension mechanism comprises a pair of roller units 65' and 67' and a pair of elastomer pad devices 61' and 63' accommodated within a pocket or cavity provided by a sideframe 17'. The pocket is defined by sidewalls 41' and 43', vertical cross plates 140 and a horizontal cross plate 47'. The roller units are shown riding on a crawler track 23'.

Figure 9:
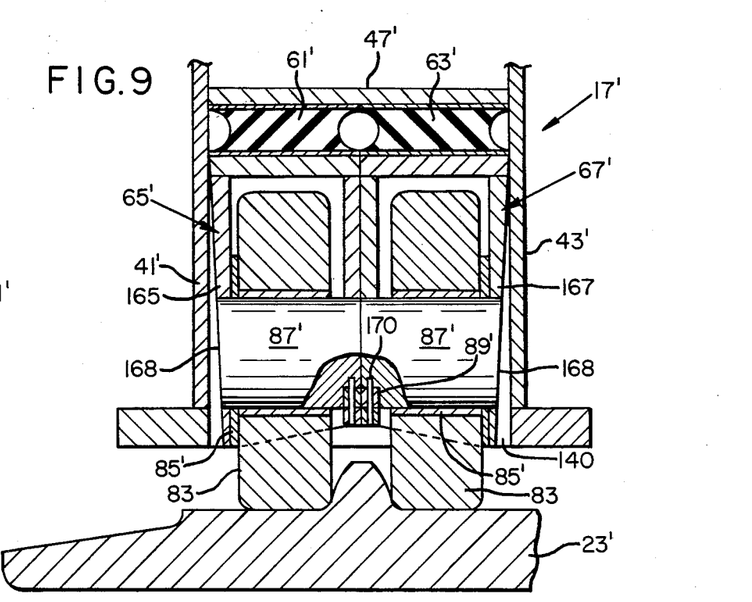
FIG. 9 is a sectional view of a modified form of roller unit assembly showing the tread on a laterally horizontal surface.
Figure 12:
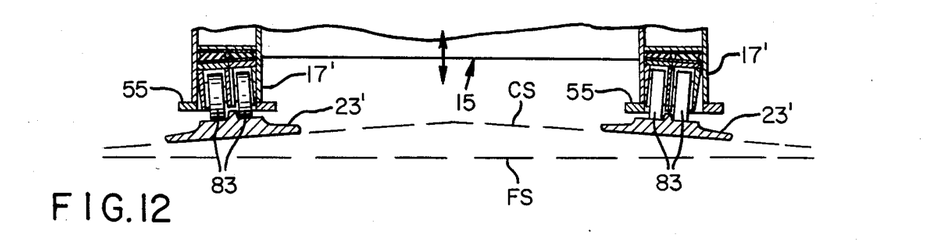
FIG. 12 is a fragmentary cross section on a reduced scale, of a vehicle incorporating the FIG. 9 roller unit.

FIG. 9 differs from FIG. 6 in that in FIG. 9, while the cavity or pocket walls are parallel, the roller units 65' and 67', taken together, have outer side faces 165 and 167 which coverage downwardly from upper portions, which substantially span the interior of the cavity. This leaves tapered gaps 168 enabling the units to tilt relative to the side frame 17 from the erect position in FIG. 9 to the tilted positions such as shown in FIG. 12. This enables the roller units to adapt to a crowned surface CS while maintaining flush contact of the rollers with the tracks 23'. Such flush contact reduces edge loading of the rollers and wear on the bushing 85, that would otherwise occur. This construction also permits the frame 15' (FIG. 12) to adjust vertically, as demanded by the changes in loading, without requiring lateral shifting of the tracks relative to the surface CS, since the inner faces of the roller units 65, 67 merely slide in flush contact with the interior walls of the cavity in vertical planes.

From the above construction, it is evident that the endless tracks 23' are mounted for rolling action in parallel planes, when riding on a flat surface, or in converging planes when riding on a crowned surface.

FIG. 9 shows that the shafts 87' of the rollers are held against rotation by elements 89' and by pins 170. Wear plates (not shown) may be provided between the roller units and the track frame, or between the roller units themselves.

Figure 10:
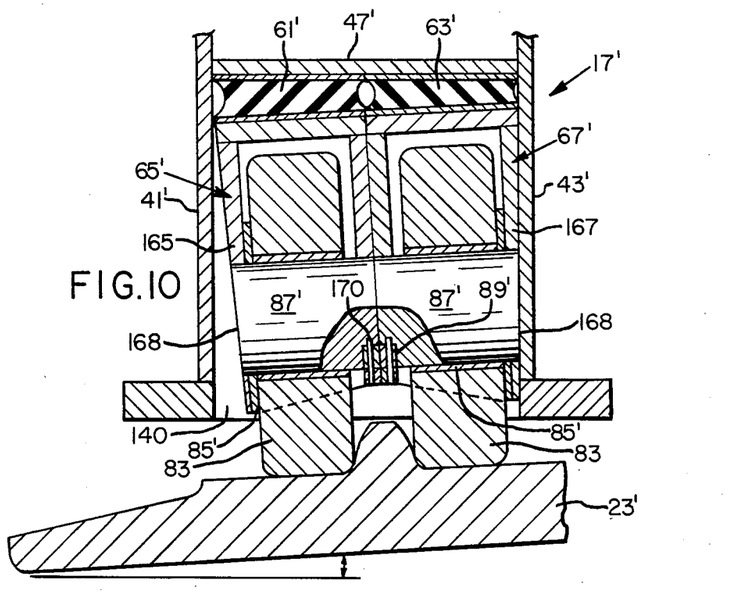
FIG. 10 is a view like FIG. 9, but showing the assembly resting on a laterally inclined surface.
Figure 11:
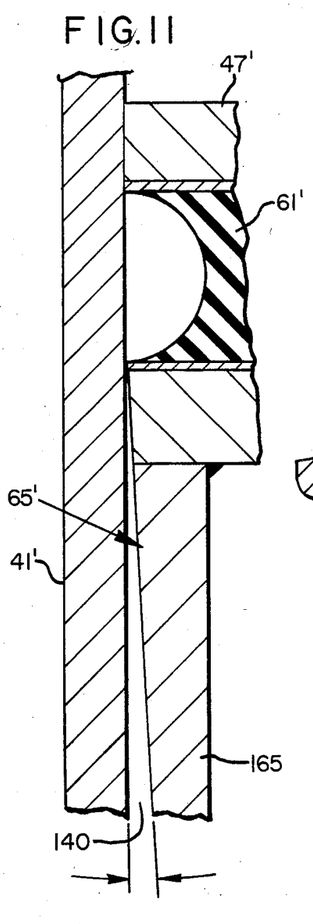
FIG. 11 is an enlarged fragmentary view of a portion of FIG. 9.

It is pointed out that in FIGS. 9 and 10, the roller units remain in the same relative position with respect to one another. It might be assumed that no relative motion between the units is necessary or desirable, since it appears that the two units behave as a single integral structure. Such an integral construction, under special circumstances, might be usable. However, I have discovered that my arrangement is more advantageous in that relative movement of the two roller units in a pocket does occur during momentary tilting of one or more lower treads, as happens when such treads encounter an abrupt hum in the terrain being traversed.

Figure 13:
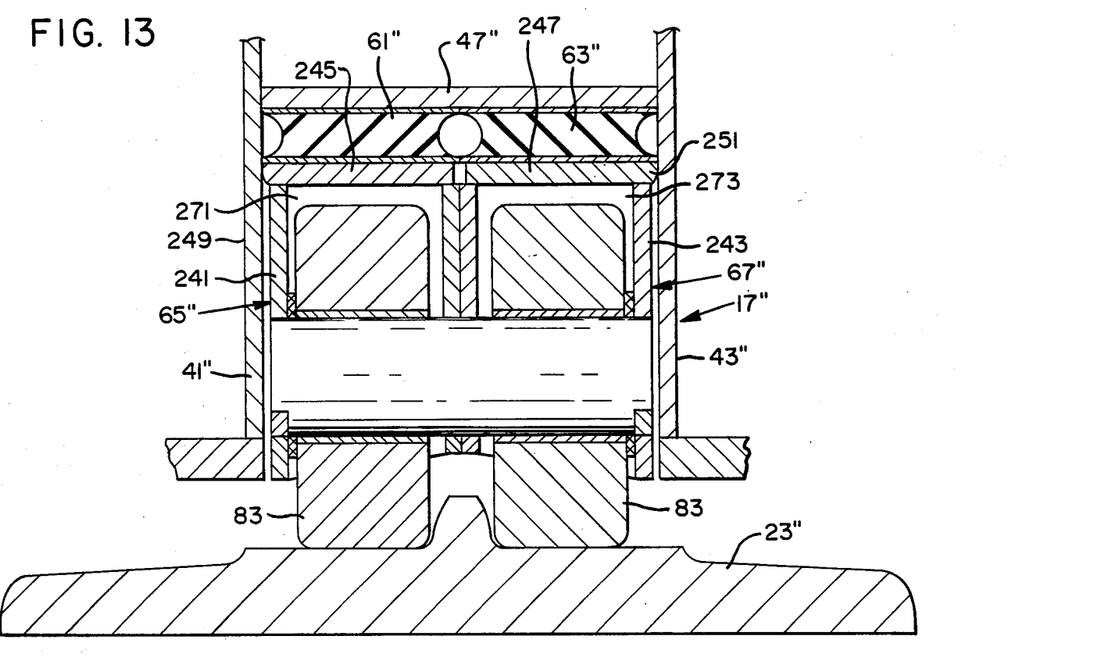
FIGS. 13 and 14 are views like FIGS. 9 and 10 but showing another preferred form of the invention.
Figure 14:
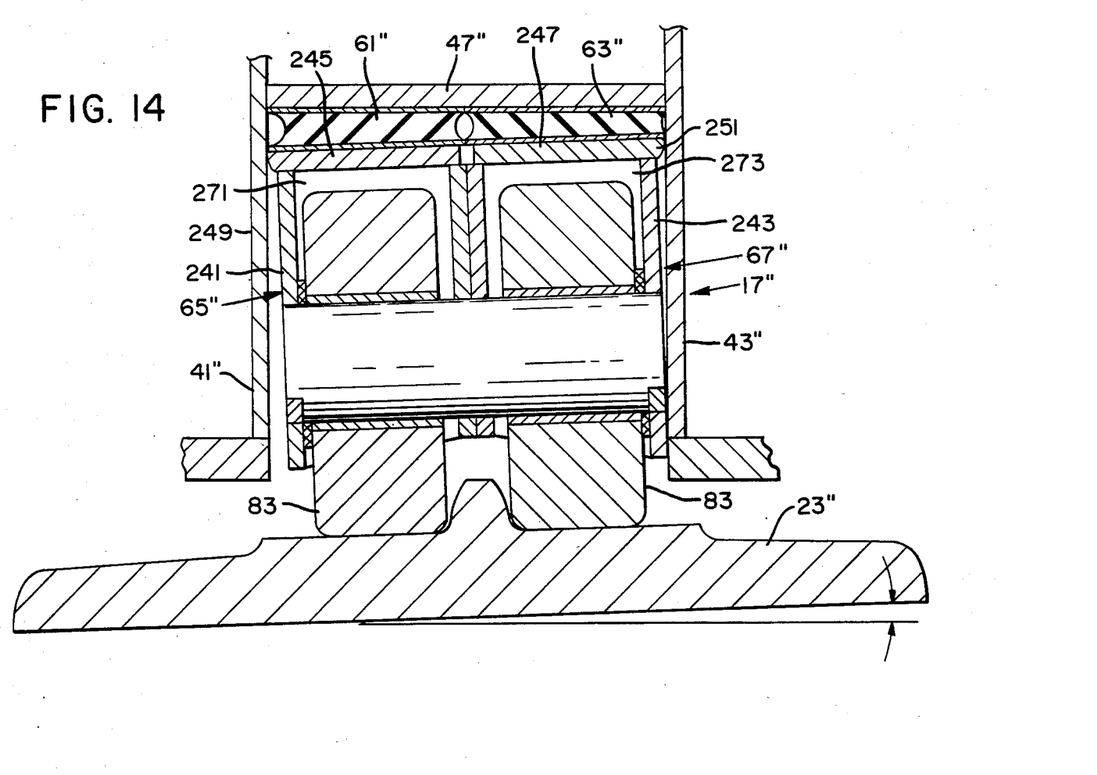

FIGS. 13-14 show a preferred form of the invention which is similar in many respects to the form shown in FIGS. 9-12. The roller unit assembly or suspension mechanism in FIG. 13 comprises a pair of roller units 65" and 67" and a pair of elastomer pad devices 61" and 63", fit within a pocket or cavity provided by a side frame 17". The pocket is defined by side walls 41" and 43", vertical cross plates 240 (FIG. 15) and a horizontal cross plate 47". The roller units are shown as riding on a crawler track 23".

FIG. 13 differs from FIG. 9 in that in FIG. 9, the outer faces of the two units converge downwardly, i.e., the outer faces of each unit is oblique to the plane of the inner face. To the contrary, in FIG. 13 the outer faces of 241 and 243 of the units are parallel to the inner faces of the units, but are spaced from the inner faces of the walls 41" and 43" in the upright positions of the units. However, top walls 245 and 247 of the units 65" and 67", respectively, have outer end portions 249 and 251 which overhang or project beyond the associated side walls 241 and 243, into contiguous relationship to the inner faces of the walls 41" and 43". The end edges of the walls are preferably rounded to prevent edge contact of portions 249 and 251 with wals 41" and 43" and to facilitate a rocking action of such edges on said walls.

When a crawler vehicle like that in FIG. 12, is equipped with crawler units of FIG. 13 and rides on a crowned surface, the roller units 65" and 67" can tilt as shown in FIG. 14 so as to maintain flush contact between the rollers and the crawler track 23", thereby to avoid edge loading of the rollers. Tilting movement of the roller units will compress the pad devices 61" and 63" to different degrees as is shown in FIG. 14.

It is pointed out that the form of the invention in FIGS. 13 and 14 permits rocking of the roller units within the pocket, yet does not require any tapering of the side walls of the units. Thus, the construction of FIGS. 13, 14 is simpler than in the form in FIGS. 9 and 10.

While the faces 241 and 243 are spaced from the inner walls of the cavity, the end walls 271 and 273 of the metal boxes, which house the rollers 83, are in flush sliding engagement with the opposed end walls of the cavity, rather than being spaced from such walls. Thus the rocking movement of the roller units is laterally or from side to side, not longitudinally.

Figures 14A, 15, 16, 17:
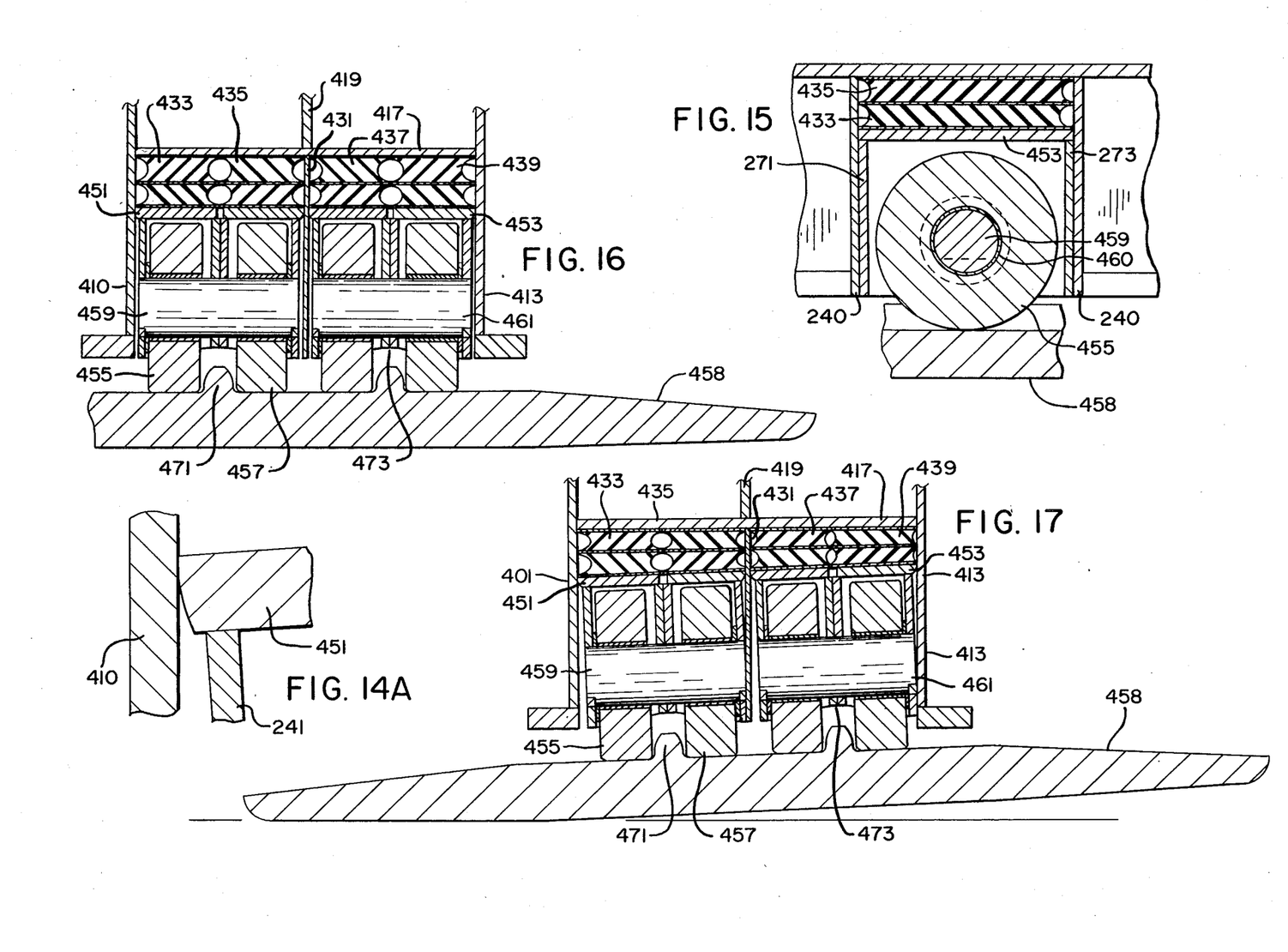
FIG. 14A is an enlarged fragmentary portion of FIG. 17.
FIG. 15 is a longitudinal sectional view through the arrangement in FIG. 16.
FIGS. 16 and 17 show a four roller unit incorporating the concepts of the present invention.

FIGS. 15-17 show a way of taking components common with previously described forms of the invention and duplicating them to provide a supporting structure capable of handling substantially greater loads than in the case of crawler frames having rollers arranged in sets of two. Obviously the track shoes are substantially longer to spread the load laterally whereby to avoid having to elongate the track frames in order to spread the load.

Referring to FIG. 16, the track frame shown comprises side walls 410 and 413 connected by vertical cross plates, not shown, and a horizontal cross plate 417, to define a large downwardly directed cavity. Preferably the track frame includes a central wall 419.

The large cavity is divided into two pockets by a vertical longitudinally extending separator plate 431, which is secured at its upper edge to the cross plate 417 and at its end edges to the vertical cross plates, above referred to. This provides a pair of downwardly directed pockets very similar to the pockets referred to in the previous forms of the invention.

In this case, however, since substantially greater deflections are to be handled, there are two pairs of elastomer pad devices for each pocket, labeled 433 and 435 for the left hand pocket in FIG. 16, and 437 and 439 for the right hand pocket. These pad devices are shown as duplicates of the pads in the previous forms of the invention, except that they are duplicated so that the four elastomer pad devices in each pocket are arranged in pairs, each pair comprising an upper and lower elastomer pad device. This arrangement enables the roller unit to handle larger vertical deflections.

Within each pocket is a roller unit labeled 451 for the left hand pocket and 453 for the right hand pocket. These units are very much like the units in FIGS. 13 and 14 except that the two rollers 455 and 457 for each roller unit are mounted on a common shaft, labeled 459 for the left unit and 461 for the right, rather than on individual shafts as in FIGS. 13 and 14. Note that the roller units 451 and 453 have pairs of central separator plates 471 and 473, respectively, to support the shafts 459 and 461, respectively.

Ideally, the rollers of a roller unit would be mounted for movement independent of one another, but a common shaft construction is found preferable to provide easy access for lubrication. That is to say, in the FIG. 14 form of the invention, access holes (not shown) are provided in the side walls to enable a lubricant supplying device to be inserted into these access holes and into alignment with lubricating bores (not shown) provided in the shafts for the rollers. These bores project inwardly generally axially and then radially to supply lubricant to the bearing load surfaces of the rollers.

However, with a construction as shown in FIG. 16, there is no convenient way to supply lubricant to the load bearing surfaces for the inner rollers, other than by use of a common shaft. It is contemplated that the common shaft will have one angular bore to receive lubricant for one roller and a second angular bore for receiving lubricant for the second roller. The same will be true of the right hand roller unit.

Note that I have not shown any liners for the FIG. 16 form of the invention. I consider the liners an optional feature.

Apart from the roller units in FIG. 16 having common shafts, they are similar in exterior construction to the form of invention in FIG. 13, in that the boxes for the rollers have upper plate portions that project laterally beyond the side walls of the boxes so as to provide space to enable the boxes to tilt laterally, to accommodate operation on crowned or uneven surfaces. The ends of the overhangs of the upper plates of the box will be rounded as in FIGS. 13 and 14 form of invention.

It is contemplated that the boxes will have tilting movement only laterally, not longitudinally because in a longitudinal direction the boxes will be confined in the manner as is the box in FIG. 15.

FIG. 17 shows the crawler tracks operating on an inclined surface, such as a crowned roadway, wherein the crawler frame maintains substantially vertical position while the crawler tread is oblique to the horizontal. FIG. 17 shows that the boxes pivot within their pockets to accommodate this condition. An advantage of the four roller unit is that if the tilt conditions exceed the rocking capabilities of the roller units, any edge loading that occurs will occur on two rollers rather than one, so that there will be a sharing of the load under these momentary conditions.

Each of the common shafts 459 and 461 is held against rotation and axial motion by a pair of keys, one at each end of the shaft. These keys preferably are welded in place.

The roller units 451 and 453 can comprise a pair of separate boxes as are provided in FIG. 14 (for inexpensive interchangeability of parts) or the two boxes of a unit can be fixed to one another. The rollers of such units ride on the tread 458, with each pair of rollers straddling a guide lug on the tread.

FIG. 14A best shows the rounding off of the overhangs of the roller boxes to provide for surface to surface rocking contact with the inner faces of the crawler frame.

FIG. 15 shows not only plain bearings 460, but also the sliding flush engagement of the ends of the boxes with opposed end walls 240 of the cavity.

What is claimed is:

1. A suspension mechanism for a crawler unit of a track supported vehicle, comprising:
   - at least one track frame for said vehicle,
   - at least one lower track roller for said frame,
   - a box containing said roller,
   - said frame defining a downwardly facing cavity telescopically slidably receiving said box, said cavity being of uniform cross sectional shape vertically,
   - said frame providing at the top of said cavity a thrust receiving structure,
   - yieldable means slidably received within said cavity and yieldably mounting said box in said cavity including spaced horizontal rigid plate means bonded to and disposed on the opposite sides of elastomer layer means,
   - said yieldable means arranged in thrust transmitting relationship between said box and said thrust receiving structure,
   - said frame providing wall portions disposed next to the edges of said elastomer layer means,
   - said elastomer layer means being recessed inwardly away from said wall portions to provide space to be occupied by said elastomer layer means when the latter is under compression,
   - said wall portions defining limits to free deformation of said elastomer layer means when said layer is compressed into contact with said wall portions whereby to preclude rupturing of said yieldable means and to preclude overstressing of the bond between said elastomer layer means and said plate means.

2. Suspension mechanism for a crawler unit of a track supported vehicle comprising:
   - a frame providing vertical guideways,
   - a box-like roller unit,
   - a yieldable pad unit coextensive horizontally with said roller unit,
   - said pad unit and box-like roller unit being slidably received in stacked relationship within said vertical guides.

3. In a crawler unit of a track-supported vehicle,
   - a track frame providing vertical guideways,
   - a pair of roller units each having at least one roller, said roller units being disposed within said guideways in sliding engagement therewith and in side-by-side sliding contact with one another in a plane normal to the axes of rotation of said rollers, with the rollers in side-by-side spaced relationship, and yieldable means for resisting upward movement of said roller units.

4. In a crawler unit for a mobile track supported structure, at least one track frame, said track frame providing a downwardly facing pocket, a roller unit, an elastomeric pad unit for said roller unit coextensive horizontally with said roller unit, said units being slidably received in stacked relationship in said pocket with said elastomer pad unit above said roller unit and with said roller unit adapted when loaded to compress said pad unit so that the roller unit may adjust its vertical position within said pocket in accordance with the loading imposed thereon.

5. A suspension mechanism for a crawler vehicle comprising a framework defining a cavity providing parallel vertical guideways, a track roller unit within said cavity having wall portions in sliding engagement with said guideways, yieldable means above said roller unit, said wall portions tapering downwardly and inwardly and away from said vertical guideways to facilitate tilting movement of said unit within said cavity toward and away from said guideways.

6. In a crawler vehicle having a frame, a pair of endless crawler tracks disposed one at each side of said frame, means mounting said tracks on said frame for rolling action in parallel planes when riding on a flat surface, or in converging planes when riding on a crawled surface, said mounting means including a pair of vertical parallel guide surfaces for each of said tracks, and roller means in metal-to-metal slidable engagement with said guide surfaces, each pair of said parallel guide surfaces being arranged so that their planes are longitudinally disposed and are parallel to the above mentioned parallel planes, and are intersected by the axes of rotation of said roller means.

7. In a crawler vehicle as recited in claim 6, wherein said roller means are tiltable toward and away from said guide surfaces.

8. In a crawler vehicle as recited in claim 7, in which the roller means has non-parallel guide faces in sliding engagement with said guide surfaces.

9. A suspension mechanism for a crawler vehicle comprising a framework defining a cavity providing a first pair of parallel vertical guideways and a second pair of parallel vertical guideways which are angularly related to the first pair of guideways, a roller structure, and means mounting said roller structure for rocking movement within said cavity and in free sliding engagement with all four of said vertical guideways.

10. A suspension mechanism as set forth in claim 9 wherein said roller structure includes a metal box means for housing roller means, inner walls of said framework, which in part define said cavity, providing said guideways, said metal box means being spaced in a lateral direction from the said inner walls of said cavity, except at the upper portions of said metal box means, whereby to provide for lateral rocking movement.

11. A suspension mechanism as set forth in claim 10, wherein said metal box means has parallel side walls and has top walls which overhang the outer faces of said side walls.

12. A suspension mechanism for a crawler vehicle comprising a framework defining a pair of side-by-side downwardly facing cavities separated by a vertical wall, a roller unit freely slidably received in each cavity, each roller unit having a pair of rollers, said units being so disposed within said cavities that the axes of rotation of the rollers intersects said vertical wall, at least one superimposed pair of horizontal elastomer pad devices for each cavity disposed above each unit in stacked relactionship within the cavities.

13. Suspension mechanism for a crawler unit of a track supported vehicle, comprising:

a track frame including at least one metal box of hollow rectangular parallelpiped shape having opposed side walls, opposed end walls, a top wall, and an open bottom, said box providing a roller-unit-receiving chamber a pair of roller units freely slidably received in said chamber and each including a downwardly opening metal box having parallel end walls slidably received by the end walls of said chamber, each roller unit box having an inner side wall in face-to-face sliding engagement with the inner side wall of the other unit, each roller unit having a top wall, the top walls of said roller units fully and completely spanning the length and breadth of said chamber to define, with the chamber top wall, an enclosed space of parallelpiped shape, each roller unit having at least one roller with its axis intersecting the side walls of its unit, and yieldable means freely disposed within said enclosed space and being supported by the top walls of said units and compress by the loads imposed on said rollers.

14. A suspension mechanism for a crawler unit of a track supported vehicle as described in claim 13, wherein each roller unit has a downwardly and inwardly tapered outer side wall.

15. A suspension mechanism for a crawler unit of a track supported vehicle as described in claim 14, wherein said taper is created by a projecting edge at the outer side wall only, of the top wall of each roller unit.

* * * * *